(12) United States Patent
Lee

(10) Patent No.: US 8,919,103 B2
(45) Date of Patent: Dec. 30, 2014

(54) SYSTEM FOR PURIFYING EXHAUST GAS AND EXHAUST SYSTEM HAVING THE SAME

(75) Inventor: Jin Ha Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 150 days.

(21) Appl. No.: 13/307,890

(22) Filed: Nov. 30, 2011

(65) Prior Publication Data

US 2013/0000283 A1 Jan. 3, 2013

(30) Foreign Application Priority Data

Jul. 1, 2011 (KR) .................. 10-2011-0065667

(51) Int. Cl.
| | |
|---|---|
| F01N 3/00 | (2006.01) |
| F01N 3/20 | (2006.01) |
| F01N 3/035 | (2006.01) |
| F01N 3/10 | (2006.01) |
| F01N 3/029 | (2006.01) |
| F01N 9/00 | (2006.01) |
| F01N 3/023 | (2006.01) |

(52) U.S. Cl.
CPC ............. *F01N 9/002* (2013.01); *F01N 3/208* (2013.01); *F01N 2610/02* (2013.01); *F01N 2610/1433* (2013.01); *F01N 3/035* (2013.01); *F01N 3/103* (2013.01); *F01N 2610/1486* (2013.01); *F01N 2610/01* (2013.01); *F01N 2900/1406* (2013.01); *F01N 3/0293* (2013.01); *F01N 2610/14* (2013.01); *Y02T 10/47* (2013.01); *F01N 2610/1406* (2013.01); *F01N 3/023* (2013.01); *Y02T 10/24* (2013.01); *F01N 3/206* (2013.01); *F01N 3/2066* (2013.01)
USPC ............ 60/295; 60/286; 60/297; 60/303

(58) Field of Classification Search
USPC .............. 60/286, 295, 297, 301, 303, 311
See application file for complete search history.

(56) References Cited

U.S. PATENT DOCUMENTS

| | | | |
|---|---|---|---|
| 5,149,399 A | 9/1992 | Kishi et al. | |
| 7,229,597 B2 * | 6/2007 | Patchett et al. | 422/177 |
| 7,937,933 B2 * | 5/2011 | Doring et al. | 60/286 |
| 8,166,751 B2 * | 5/2012 | Robel | 60/297 |
| 8,246,922 B2 * | 8/2012 | Boorse et al. | 423/213.2 |
| 8,407,987 B2 * | 4/2013 | Andersson et al. | 60/288 |
| 8,448,424 B2 * | 5/2013 | Huang et al. | 60/286 |
| 2003/0226312 A1 | 12/2003 | Roos et al. | |
| 2007/0144152 A1 | 6/2007 | Lueders | |

(Continued)

FOREIGN PATENT DOCUMENTS

| | | |
|---|---|---|
| EP | 0 997 616 A2 | 5/2000 |
| EP | 1 892 396 A1 | 2/2008 |

(Continued)

*Primary Examiner* — Binh Q Tran
(74) *Attorney, Agent, or Firm* — Morgan, Lewis & Bockius LLP

(57) ABSTRACT

A system for purifying an exhaust gas and an exhaust system having the same while preventing degradation of a selective reduction catalyst may include an exhaust pipe connected to an engine, the exhaust gas generated at the engine passing through the exhaust pipe, a particulate filter mounted on the exhaust pipe, coated with a selective reduction catalyst adapted to reduce nitrogen oxides contained in the exhaust gas by an injection of a reducing agent, and adapted to trap particulate matters contained in the exhaust gas, and one or more injectors adapted to inject the reducing agent and/or oxygen storage capacity material together or separately into the exhaust gas passing through the exhaust pipe.

18 Claims, 4 Drawing Sheets

(56) References Cited

U.S. PATENT DOCUMENTS

2010/0175370 A1* 7/2010 Bunge .......................... 60/277
2010/0300078 A1 12/2010 Lu et al.

FOREIGN PATENT DOCUMENTS

| | | |
|---|---|---|
| FR | 2 895 445 A1 | 12/2006 |
| JP | 2004-509740 A | 4/2004 |
| JP | 2006-183507 A | 7/2006 |
| JP | 2009-68348 A | 4/2009 |
| JP | 2010-19134 A | 1/2010 |
| JP | 2010-19221 A | 1/2010 |
| KR | 1989-0016991 A | 12/1989 |
| KR | 10-2007-0118051 A | 12/2007 |

* cited by examiner

SYSTEM FOR PURIFYING EXHAUST GAS AND EXHAUST SYSTEM HAVING THE SAME

CROSS-REFERENCE TO RELATED APPLICATION

The present application claims priority of Korean Patent Application Number 10-2011-0065667 filed in the Korean Intellectual Property Office on Jul. 1, 2011, the entire contents of which application is incorporated herein for all purposes by this reference.

BACKGROUND OF INVENTION

1. Field of Invention

The present invention relates to a system for purifying an exhaust gas and an exhaust system having the same. More particularly, the present invention relates to a system for purifying an exhaust gas and an exhaust system having the same which prevents degradation of a selective reduction catalyst by lowering a regeneration temperature of a particulate filter on which the selective reduction catalyst is coated.

2. Description of Related Art

Generally, exhaust gas flowing out through an exhaust manifold from an engine is driven into a catalytic converter mounted at an exhaust pipe and is purified therein. After that, the noise of the exhaust gas is decreased while passing through a muffler and then the exhaust gas is emitted into the air through a tail pipe.

A selective catalytic reduction (SCR) catalyst is one type of such a catalytic converter.

Reducing agents such as urea, ammonia, carbon monoxide, and hydrocarbon (HC) react better with nitrogen oxides than with oxygen in the SCR catalyst.

In addition, a particulate filter is mounted on the exhaust pipe and traps particulate matters (PM or soot) contained in the exhaust gas. If excess soot is trapped in the particulate filter, it is difficult for the exhaust gas to pass the particulate filter and a pressure of the exhaust gas increases. If the pressure of the exhaust gas is high, engine performance may be deteriorated and the particulate filter may be damaged. Therefore, if an amount of the soot trapped in the particulate filter is larger than or equal to a predetermined amount, a temperature of the exhaust gas is raised so as to burn the soot trapped in the particulate filter. Such a process is called a regeneration of the particulate filter.

A conventional system for purifying an exhaust gas includes an oxidizing catalyst for purifying carbon monoxide and hydrocarbon contained in the exhaust gas, a particulate filter for filtering particulate matters (or soot) contained in the exhaust gas, and a SCR catalyst for purifying nitrogen oxides contained in the exhaust gas. In addition, the conventional system for purifying the exhaust gas further includes a first injector for injecting a reducing agent to the SCR catalyst and a second injector for injecting a fuel when regenerating the particulate filter. Therefore, a small vehicle lacks a space where the system for purifying the exhaust gas is mounted.

Meanwhile, the SCR catalyst is mounted at a downstream of the particulate filter according to the conventional system for purifying the exhaust gas. In order to regenerate the particulate filter, an inlet temperature of the particulate filter is raised to at least 600° C. In this case, an inner temperature of the particulate filter is raised to a temperature higher than 800° C. as shown in FIG. 4. A degradation temperature is different according to types of the SCR catalyst, but degradation of the SCR catalyst proceeds quickly if a temperature of the SCR catalyst is higher than 800° C. Therefore, the particulate filter and the SCR catalyst are mounted with a predetermined distance. Accordingly, the space where the system for purifying the exhaust gas is mounted is further insufficient in the small vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a system for purifying an exhaust gas and an exhaust system having the same having advantages of reducing a mounting space by coating a selective reduction catalyst on a particulate filter.

In addition, other various aspects of the present invention are directed to provide a system for purifying an exhaust gas and an exhaust system having the same which prevent degradation of the selective reduction catalyst coated on the particulate filter by lowering a regeneration temperature of the particulate filter.

An exemplary system for purifying an exhaust gas according to the present invention may include: an exhaust pipe connected to an engine, the exhaust gas generated at the engine passing through the exhaust pipe; a particulate filter mounted on the exhaust pipe, coated with a selective reduction catalyst which is adapted to reduce nitrogen oxides contained in the exhaust gas by an injection of a reducing agent, and adapted to trap particulate matters contained in the exhaust gas; and a first injector adapted to inject the reducing agent into the exhaust gas passing through the exhaust pipe, wherein the first injector is adapted to inject the reducing agent containing an oxygen storage capacity material.

The system for purifying the exhaust gas may further include: a first tank adapted to store therein the oxygen storage capacity material and the reducing agent; and a first pump adapted to pump the oxygen storage capacity material and the reducing agent stored in the first tank and to supply the same to the first injector.

An aqueous solution in which the oxygen storage capacity material and the reducing agent are mixed may be stored in the first tank.

Another exemplary system for purifying an exhaust gas according to the present invention may include: an exhaust pipe connected to an engine, the exhaust gas generated at the engine passing through the exhaust pipe; a particulate filter mounted on the exhaust pipe, coated with a selective reduction catalyst which is adapted to reduce nitrogen oxides contained in the exhaust gas by an injection of a reducing agent, and adapted to trap particulate matters contained in the exhaust gas; a first injector adapted to inject the reducing agent into the exhaust gas passing through the exhaust pipe; and a second injector adapted to inject an oxygen storage capacity material into the exhaust gas passing through the exhaust pipe.

The system for purifying the exhaust gas may further include: a first tank adapted to store therein the reducing agent; a first pump adapted to pump the reducing agent stored in the first tank and to supply the same to the first injector; a second tank adapted to store therein the oxygen storage capacity material; and a second pump adapted to pump the oxygen storage capacity material stored in the second tank and to supply the same to the second injector.

The first tank may be disposed in the second tank. The oxygen storage capacity material may be stored as an organic solution in the second tank. The oxygen storage capacity material may prevent the reducing agent from freezing.

In exemplary systems for purifying an exhaust gas according to the present invention, the reducing agent may be urea or ammonia.

The oxygen storage capacity material may have a characteristics of storing oxygen in the exhaust gas well and may be a cerium or ferrous chemical material or other suitable materials.

Yet another exemplary exhaust systems according to the present invention may further include: an exhaust pipe connected to an engine, the exhaust gas generated at the engine passing through the exhaust pipe; a turbo charger mounted on the exhaust pipe and adapted to increase an intake by using energy of the exhaust gas; an oxidizing catalyst mounted on the exhaust pipe downstream of the turbo charger and adapted to oxidize hydrocarbon contained in the exhaust gas; a particulate filter mounted on the exhaust pipe downstream of the oxidizing catalyst, coated with a selective reduction catalyst which is adapted to reduce nitrogen oxides contained in the exhaust gas by an injection of a reducing agent, and adapted to trap particulate matters contained in the exhaust gas; and a controller adapted to control a regeneration of the particulate filter and the injection of the reducing agent, wherein the controller is adapted to control a supply to the exhaust gas of the oxygen storage capacity material together with the reducing agent or separately from the reducing agent.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Figure 1:
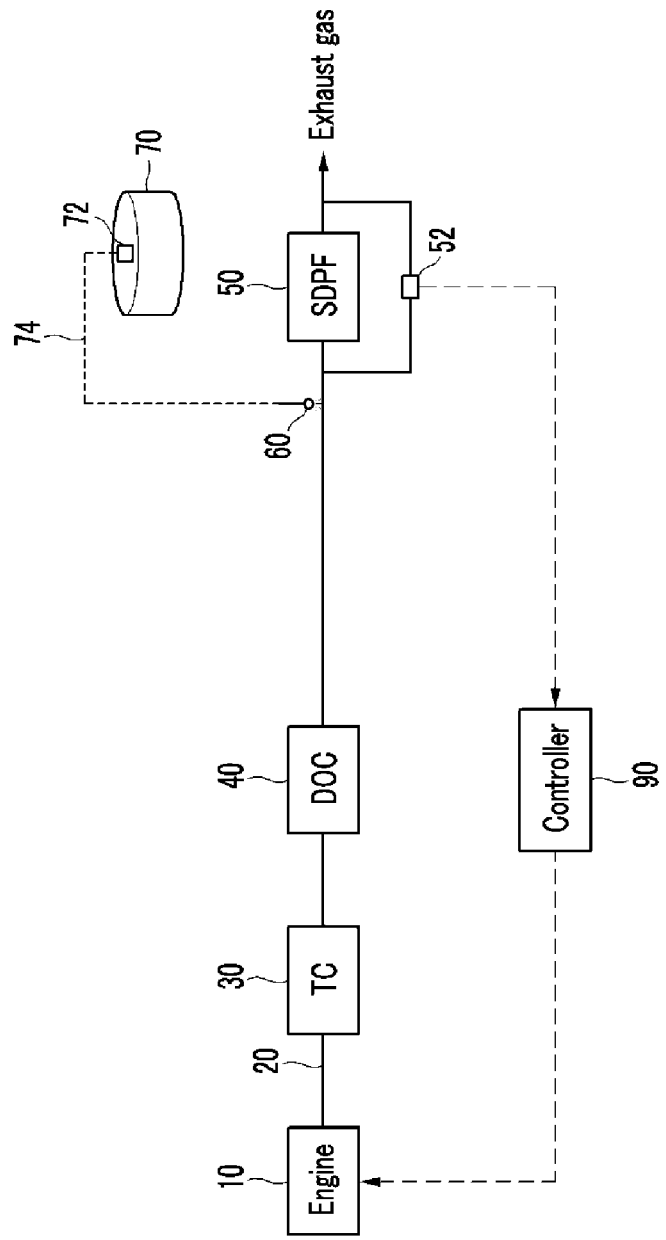
FIG. 1 is a schematic diagram of an exemplary exhaust system according to the present invention.
Figure 2:
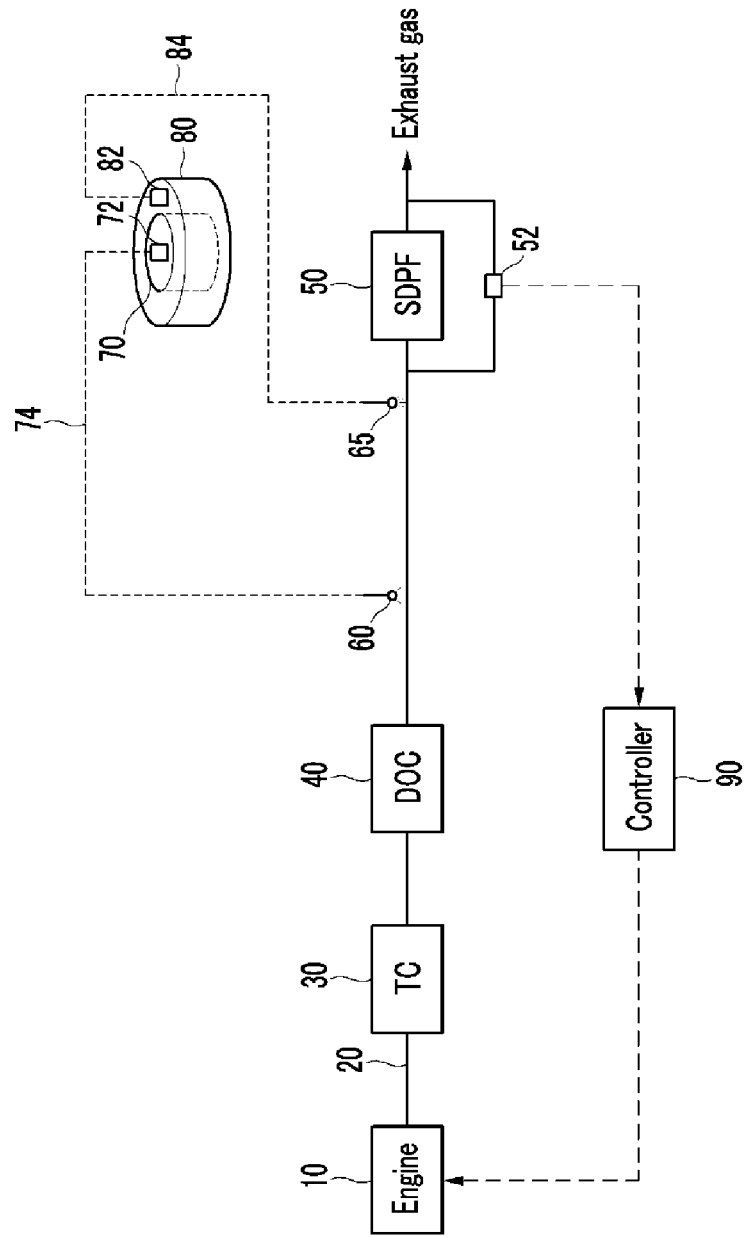
FIG. 2 is a schematic diagram of another exemplary exhaust systems according to the present invention.

FIG. 1 is a schematic diagram of an exhaust system according to various embodiments of the present invention, and FIG. 2 is a schematic diagram of an exhaust system according to other embodiments of the present invention.

As shown in FIG. 1 and FIG. 2, an exhaust gas generated at an engine 10 passes sequentially through a turbo charger 30, an oxidizing catalyst 40, and a particulate filter 50 such that noxious materials in the exhaust gas are removed. The turbo charger 30, the oxidizing catalyst 40, and the particulate filter 50 are mounted on an exhaust pipe 20.

The engine 10 burns an air-fuel mixture in which fuel and air are mixed so as to convert chemical energy into mechanical energy. The engine 10 is connected to an intake manifold so as to receive the air in a combustion chamber, and is connected to an exhaust manifold such that an exhaust gas generated in a combustion process is gathered in the exhaust manifold and is exhausted to the exterior. An injector is mounted at the combustion chamber so as to inject the fuel into the combustion chamber.

The exhaust pipe 20 is connected to the exhaust manifold so as to exhaust the exhaust gas to the exterior of the vehicle.

The turbo charger 30 is mounted on the exhaust pipe 20, and a turbine of the turbo charger 30 is rotated by using energy of the exhaust gas so as to increase an intake amount of an air.

The oxidizing catalyst 40 is mounted on the exhaust pipe 20 downstream of the turbo charger 30 and oxidizes hydrocarbon contained in the exhaust gas into carbon dioxide. Noble metals including palladium and platinum is generally used as the oxidizing catalyst 40, but is not limited to this. The hydrocarbon represents all compounds consisting of carbon and hydrogen contained in the exhaust gas and the fuel in this specification and claims. In addition, it is to be understood that carbon monoxide is included in the hydrocarbon.

The particulate filter 50 is mounted on the exhaust pipe 20 downstream of the oxidizing catalyst 40 and traps soot contained in the exhaust gas. In addition, a selective reduction catalyst is coated on the particulate filter 50. The selective reduction catalyst reduces nitrogen oxides contained in the exhaust gas into nitrogen gas by using a reducing agent. For this purpose, a first injector 60 is mounted at the exhaust pipe 20 upstream of the particulate filter 50 so as to inject the reducing agent into the exhaust gas passing through the exhaust pipe 20. The reducing agent may be ammonia or urea. Generally, the first injector 60 injects the urea, and the injected urea is decomposed into the ammonia.

Since the selective reduction catalyst is coated on the particulate filter 50, a mounting space of the exhaust system is reduced.

In addition, a pressure difference sensor 52 is mounted between an inlet and an outlet of the particulate filter 50, and a regeneration of the particulate filter 50 is performed based on the detected value by the pressure difference sensor 52.

Figure 3:
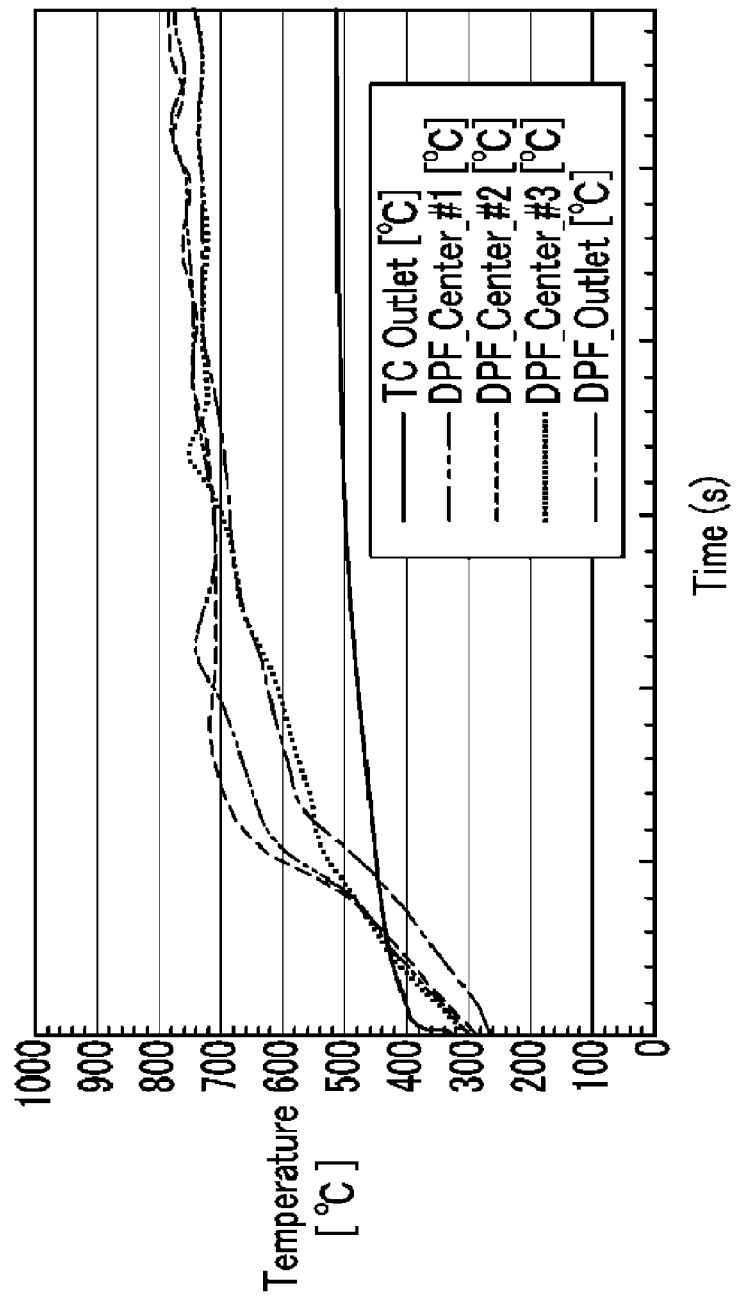
FIG. 3 is a graph showing an inner temperature of a particulate filter when regenerating the particulate filter used in accordance with the present invention.
Figure 4:
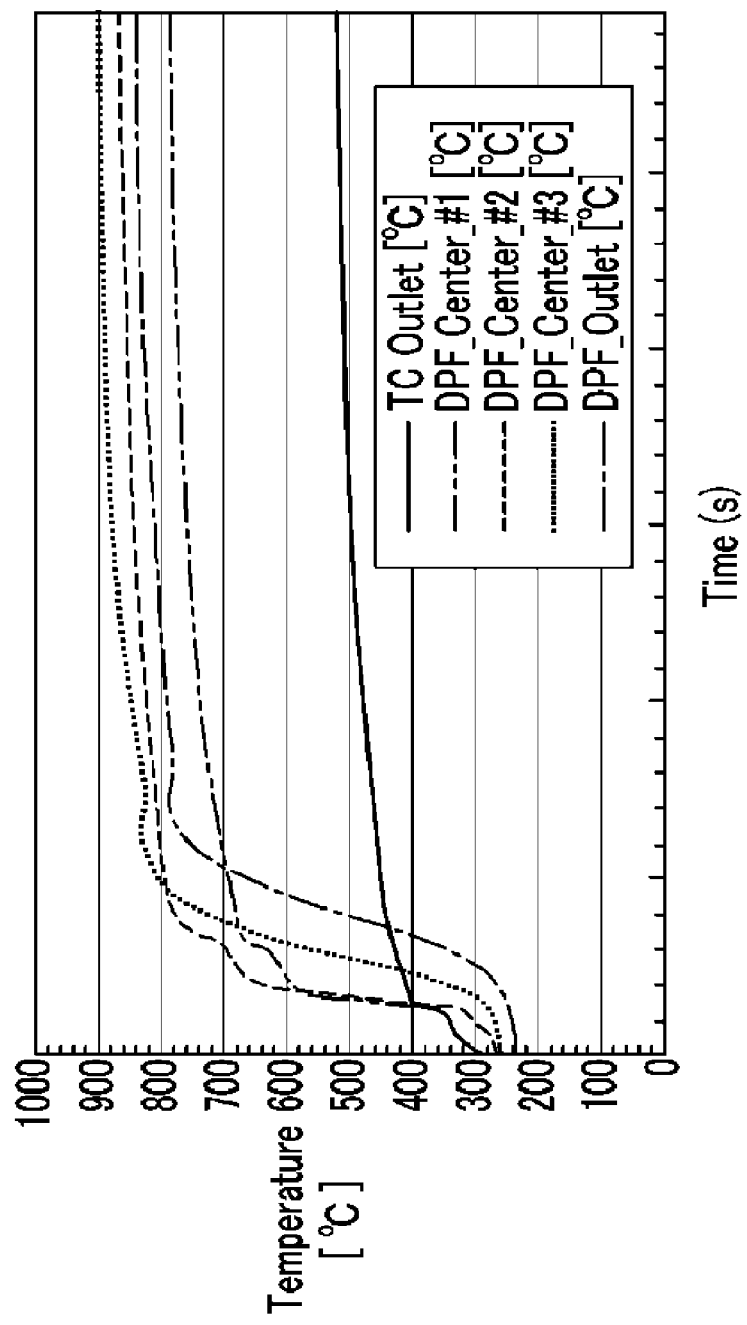
FIG. 4 is a graph showing an inner temperature of a particulate filter when regenerating a conventional particulate filter.

Meanwhile, in a case that the selective reduction catalyst is coated on the particulate filter 50, a regeneration temperature of the particulate filter 50 is lowered so as to prevent degradation of the selective reduction catalyst. For this purpose, an oxygen storage capacity material is injected into the exhaust gas flowing out from the oxidizing catalyst 40 according to various embodiments of the present invention. The oxygen storage capacity material has characteristics of storing therein oxygen in the exhaust gas well. Cerium or ferrous chemical material or other suitable material is used as such an oxygen storage capacity material. The oxygen storage capacity material stores the oxygen in the exhaust gas therein and supplies the stored oxygen to the soot so as to promote oxidation of the soot. Accordingly, the particulate filter 50 can be regenerated at a temperature lower than a conventional regeneration temperature of the particulate filter 50. Since the particulate filter 50 can be regenerated at a lower temperature, an inner temperature of the particulate filter 50 will not be raised to a temperature, i.e. about 800° C. at which the selective reduction catalyst can be degraded, as shown in FIG. 3. Therefore, degradation of the selective reduction catalyst can be prevented.

The oxygen storage capacity material may be stored together with the reducing agent or separately from the reducing agent. The exhaust system in which the oxygen storage capacity material is stored together with the reducing agent is shown in FIG. 1, and the exhaust system in which the oxygen storage capacity material is stored separately from the reducing agent is shown in FIG. 2.

As shown in FIG. 1 where the oxygen storage capacity material is stored together with the reducing agent, the exhaust system further includes a first tank 70 in which the reducing agent is stored and a first pump 72 pumping the reducing agent stored in the first tank 70 and supplying the reducing agent to the first injector 60 through a first supply line 74. At this time, aqueous solution in which the oxygen storage capacity material and the reducing agent are mixed is stored in the first tank 70. Therefore, when the reducing agent is supplied to the exhaust gas through the first injector 60, the oxygen storage capacity material is also supplied to the exhaust gas. The oxygen storage capacity material supplied to the exhaust gas supplies the oxygen to the soot when the particulate filter 50 is regenerated. Therefore, the regeneration temperature of the particulate filter 50 is lowered.

As shown in FIG. 2 where the oxygen storage capacity material is stored separately from the reducing agent, the exhaust system further includes the first tank 70 in which the reducing agent is stored, the first pump 72 pumping the reducing agent stored in the first tank 70 and supplying the reducing agent to the first injector 60 through the first supply line 74, a second tank 80 in which the oxygen storage capacity material is stored, a second pump 82 pumping the oxygen storage capacity material stored in the second tank 80 and supplying the oxygen storage capacity material to a second injector 65 through a second supply line 84, and the second injector 65 mounted at the exhaust pipe 20 and supplying the oxygen storage capacity material to the exhaust gas.

The urea or other suitable material is stored as aqueous solution form in the first tank 70, and the oxygen storage capacity material is stored as organic solution form in the second tank 80.

The first tank 70 is disposed in the second tank 80. In such a configuration, the first tank 70 is positioned in the oxygen storage capacity material stored in the second tank 80 such that freezing of the urea aqueous solution is prevented. Generally, a freezing point (about −50° C.) of the organic solution having the oxygen storage capacity material is lower than that (about −11° C.) of the urea aqueous solution. Therefore, the oxygen storage capacity material warms up the urea aqueous solution and prevents the freezing of the urea aqueous solution. In addition, since a heater is not used for preventing the freezing of the urea aqueous solution, cost is curtailed. Since power for operating the heater is not generated, fuel economy may be improved.

Meanwhile, the first pump 72 supplies the reducing agent to the first injector 60 and the second pump 82 supplies the oxygen storage capacity material to the second injector 65. Therefore, supplies of the reducing agent and the oxygen storage capacity material to the exhaust gas can be controlled independently.

As shown in FIG. 1 and FIG. 2, the exhaust system according to various embodiments of the present invention further includes a controller 90. The controller 90 controls the regeneration of the particulate filter 50 based on the detected value by the pressure difference sensor 52. For example, the controller 90 controls the injector injecting the fuel so as to raise a temperature of the exhaust gas when the detected value by the pressure difference sensor 52 is higher than a predetermined value. At this time, the first injector 60 and/or the second injector 65 is controlled to inject the oxygen storage capacity material to the exhaust gas. Since the oxygen storage capacity material is supplied to the exhaust gas, the inner temperature of the particulate filter 50 is not raised to 800° C. during the regeneration of the particulate filter 50. In addition, the controller 90 controls the first injector 60 to inject the reducing agent to the exhaust gas. The reducing agent injected to the exhaust gas reduces the nitrogen oxides into the nitrogen gas at the selective reduction catalyst. At this time, the controller 90 determines an injection amount of the reducing agent according to the nitrogen oxides contained in the exhaust gas flowing out from the oxidizing catalyst 40.

As described above, a mounting space of a selective reduction catalyst may be reduced by coating the selective reduction catalyst on the particulate filter according to various embodiments of the present invention.

In addition, degradation of the selective reduction catalyst coated on the particulate filter may be prevented by lowering a regeneration temperature of the particulate filter.

For convenience in explanation and accurate definition in the appended claims, the terms upstream or downstream, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for purifying an exhaust gas, comprising
an exhaust pipe connected to an engine, the exhaust gas generated at the engine passing through the exhaust pipe;
a particulate filter mounted on the exhaust pipe, coated with a selective reduction catalyst which is adapted to reduce nitrogen oxides contained in the exhaust gas by an injection of a reducing agent, and adapted to trap particulate matters contained in the exhaust gas; and
a first injector adapted to inject the reducing agent into the exhaust gas passing through the exhaust pipe;
wherein the first injector is adapted to inject the reducing agent containing an oxygen storage capacity material, and
wherein the oxygen storage capacity material stores free oxygen therein and supplies the free oxygen to particulate materials in the particulate filter.

2. The system of claim 1, wherein the reducing agent is urea or ammonia.

3. The system of claim 1, wherein the oxygen storage capacity material is a cerium or ferrous chemical material.

4. The system of claim 1, further comprising:
a first tank adapted to store therein the oxygen storage capacity material and the reducing agent; and
a first pump adapted to pump the oxygen storage capacity material and the reducing agent stored in the first tank and to supply the same to the first injector.

5. The system of claim 4, wherein an aqueous solution in which the oxygen storage capacity material and the reducing agent are mixed is stored in the first tank.

6. A system for purifying an exhaust gas, comprising:
an exhaust pipe connected to an engine, the exhaust gas generated at the engine passing through the exhaust pipe;
a particulate filter mounted on the exhaust pipe, coated with a selective reduction catalyst which is adapted to reduce nitrogen oxides contained in the exhaust gas by an injection of a reducing agent, and adapted to trap particulate matters contained in the exhaust gas;
a first injector adapted to inject the reducing agent into the exhaust gas passing through the exhaust pipe; and
a second injector adapted to inject an oxygen storage capacity material into the exhaust gas passing through the exhaust pipe, and
wherein the oxygen storage capacity material stores free oxygen therein and supplies the free oxygen to particulate materials in the particulate filter.

7. The system of claim 6, wherein the reducing agent is urea or ammonia.

8. The system of claim 6, wherein the oxygen storage capacity material is a cerium or ferrous chemical material.

9. The system of claim 6, further comprising:
a first tank adapted to store therein the reducing agent;
a first pump adapted to pump the reducing agent stored in the first tank and to supply the same to the first injector;
a second tank adapted to store therein the oxygen storage capacity material; and
a second pump adapted to pump the oxygen storage capacity material stored in the second tank and to supply the same to the second injector.

10. The system of claim 9, wherein the first tank is disposed in the second tank.

11. The system of claim 9, wherein the oxygen storage capacity material is stored as an organic solution in the second tank.

12. An exhaust system, comprising:
an exhaust pipe connected to an engine, the exhaust gas generated at the engine passing through the exhaust pipe;
a turbo charger mounted on the exhaust pipe and adapted to increase an intake by using energy of the exhaust gas;
an oxidizing catalyst mounted on the exhaust pipe downstream of the turbo charger and adapted to oxidize hydrocarbon contained in the exhaust gas;
a particulate filter mounted on the exhaust pipe downstream of the oxidizing catalyst, coated with a selective reduction catalyst which is adapted to reduce nitrogen oxides contained in the exhaust gas by an injection of a reducing agent, and adapted to trap particulate matters contained in the exhaust gas; and
a controller adapted to control a regeneration of the particulate filter and the injection of the reducing agent;
wherein the controller is adapted to control a supply to the exhaust gas of an oxygen storage capacity material together with the reducing agent or separately from the reducing agent, and
wherein the oxygen storage capacity material stores free oxygen therein and supplies the free oxygen to particulate materials in the particulate filter.

13. The exhaust system of claim 12, further comprising:
a first tank adapted to store therein the oxygen storage capacity material and the reducing agent;
a first pump adapted to pump the oxygen storage capacity material and the reducing agent stored in the first tank; and
a first injector adapted to receive the oxygen storage capacity material and the reducing agent from the first pump and to inject the same to the exhaust gas.

14. The exhaust system of claim 13, wherein an aqueous solution in which the oxygen storage capacity material and the reducing agent are mixed is stored in the first tank.

15. The exhaust system of claim 12, further comprising:
a first tank adapted to store therein the reducing agent;
a first pump adapted to pump the reducing agent stored in the first tank;
a first injector adapted to receive the reducing agent from the first pump and to inject the same to the exhaust gas;
a second tank adapted to store therein the oxygen storage capacity material;
a second pump adapted to pump the oxygen storage capacity material stored in the second tank; and
a second injector adapted to receive the oxygen storage capacity material from the second pump and to inject the same to the exhaust gas.

16. The exhaust system of claim 15, wherein the first tank is disposed in the second tank.

17. The exhaust system of claim 16, wherein the oxygen storage capacity material is stored as an organic solution in the second tank.

18. The exhaust system of claim 17, wherein the oxygen storage capacity material stored in the second tank prevents the reducing agent stored in the first tank from freezing.

* * * * *